United States Patent [19]

Blackhurst

[11] Patent Number: 4,520,975
[45] Date of Patent: Jun. 4, 1985

[54] AIR-BAG EJECTION SYSTEM FOR STORE DEPLOYMENT

[75] Inventor: William R. Blackhurst, Toluca Lake, Calif.

[73] Assignee: Northrop Corporation, Hawthorne, Calif.

[21] Appl. No.: 447,223

[22] Filed: Dec. 6, 1982

[51] Int. Cl.³ .......................... B64D 1/02; F41F 5/02
[52] U.S. Cl. ................... 244/137 R; 89/1.51; 89/1.54
[58] Field of Search .................. 244/137 A, 130; 89/1.5 R, 1.5 C, 1.5 H

[56] References Cited

U.S. PATENT DOCUMENTS

| | | | |
|---|---|---|---|
| 3,053,488 | 9/1962 | Cox, Jr. ........................... | 244/130 |
| 3,494,247 | 2/1970 | Dilworth, III et al. ......... | 244/137 A |
| 3,511,457 | 5/1970 | Pogue ................................. | 89/1.5 R |
| 3,611,865 | 10/1971 | Schallert ........................... | 244/137 A |

Primary Examiner—Trygve M. Blix
Assistant Examiner—Rodney Corl
Attorney, Agent, or Firm—Terry J. Anderson

[57] ABSTRACT

For use in an aircraft having a store retaining cavity from which a loaded store may protrude beyond the envelope of the aircraft, a dual condition air bag system for substantially eliminating air turbulence about the store-cavity interface when the store is loaded, and reducing relative movement of the store during taxiing and flight of the aircraft; and for substantially eliminating air turbulence about the cavity-aircraft interface following release of the store by expansion of the air-bag to a dimension to substantially conform the exterior thereof to the envelope of the aircraft, the expanded shape of the air-bag system being controlled by a plurality of ties bonded to the inner surfaces of the air-bag to limit the displacement of the exterior surface of the air-bag when air pressure is applied to the interior thereof.

1 Claim, 4 Drawing Figures

AIR-BAG EJECTION SYSTEM FOR STORE DEPLOYMENT

BACKGROUND OF THE INVENTION

1. Field of the Invention

The present invention relates to a dual condition air-bag system, and more particularly, to an arrangement of the air-bag system in an aircraft to reduce drag on an aircraft after ejection of a store from the aircraft, and to reduce movement of a store loaded in the aircraft.

2. Description of the Prior Art

Many aircraft are designed to transport stores, such as bombs or missiles, to a target area for release at the desire of the pilot or another crew member of the aircraft. A number of these aircraft have store carriers arranged to enable the store to depend from the aircraft when loaded thereon. Several types of store carrier attaching devices, primarily hooks to engage lugs fixed to the store, are in use on aircraft to releasably retain the stores whether the aircraft is on the ground or in the air. To steady the store while it is being carried in flight to the point at which it is to be released, sway braces are usually required to prevent undesired movement during in-flight maneuvers and ground operations, such as taxiing. Such attaching devices and sway braces are generally required to extend beyond the envelope or exterior surface of the aircraft.

As do all components of an aircraft which extend externally beyond the envelope of the aircraft, this type of store carrier creates turbulence around the store carrier and the stores. Additionally, drag is created on the aircraft, and a radar cross-section signature (RCS) of the aircraft is defined. The signature images emitted at the store-carrier-to-aircraft interface and at the store-to-store carrier interface, are emitted due to sway braces and various other discontinuities that exist in the store carrier such as service covers, holes, bolt and rivet heads.

Bombs, when carried in conventional bomb-bays, are housed within the bomb bay by suitable racks attached to the interior of the aircraft fuselage. The bomb-bay opening is ordinarily closed by a pair of bomb-bay doors which swing outwardly to permit dropping of the stores or bombs through the resulting opening. With this arrangement, there is formed in the bottom of the fuselage, a relatively large opening which, at high speeds, causes an extremely turbulent flow of air into the bay cavity when the doors are open. In fact, it is found that at high speeds, the air is sufficiently turbulent in and around the bay cavity that bombs released from their racks in the ordinary fashion, will actually tumble around inside the bomb-bay. Moreover, the bomb-bay opening and the protruding bomb-bay doors cause a very great increase in drag during the critical bomb run as well as creating an unacceptable radar cross-section signature for the aircraft.

PRIOR ART STATEMENT

The following patents are cited as the most pertinent prior art of which the applicant is aware:

| U. S. PAT. NO. | NAME | DATE |
|---|---|---|
| 3,242,808 | P. T. Nelson, et al | March 29, 1966 |

-continued

| U. S. PAT. NO. | NAME | DATE |
|---|---|---|
| 2,481,542 | G. L. Schyler | September 13, 1949 |

U.S. Pat. No. 3,242,808 (P. T. Nelson, et al.) and U.S. Pat. No. 2,431,542 (G. L. Schuyler) both disclose a store attaching and ejection mechanism mounted within an open store cavity provided in an aircraft fuselage or in a nacell which is in turn mounted to the underside of an aircraft. The inventions disclosed in the patents, unlike the present invention, have no provisions for eliminating store and ejection mechanism drag or for reducing the radar image emitted due to the store, the store attaching devices, or other structural discontinuities.

SUMMARY OF THE INVENTION

By the present invention, the ability of an aircraft to carry stores in a semi-recessed manner and to seal the area after store release overcomes drag and radar signature problems associated with conventional bomb bays when open.

In the present invention, an aircraft having a store-retaining cavity from which a loaded store may protrude beyond the envelope of the aircraft is provided with a dual condition air bag system. In a first condition, when a store is loaded on the aircraft, the air bag causes substantial elimination of air turbulence about the store/cavity interface, and reduces movement of the store within the aircraft during taxiing and flight of the aircraft.

Following release of the store, the air bag expands to substantially conform to the envelope of the aircraft to effectively eliminate air turbulence about the cavity-/aircraft interface and reduce the radar signature. The shape of the air bag, when expanded, is preferably controlled by a plurality of ties bonded to opposing inner surfaces of the air bag. These ties limit the displacement of the exterior surface of the air bag when air pressure is applied to the interior of the air bag.

The present invention for a low drag store carrier and release mechanism is preferably integrated into the design of a high performance aircraft thus improving the performance of the aircraft, over comparable aircraft capable of carrying similar stores, whether in loaded or unloaded condition. The aircraft is accorded maximum survivability by incorporating reduced radar cross-section techniques in the design of a store suspension and ejection mechanism that maintains the store in a semi-submerged condition within the aircraft. Prior to the release, the store is partially submerged into the structure of the aircraft to a depth equal to half the displacement of the store. When loaded, the store provides only a small modification to the envelope of the aircraft. That the store is partially recessed or semi-submerged causes a substantial reduction of drag and radar signature of the store.

After the store is ejected an air bag system fills the cavity which would normally be left open or require additional structure to provide doors and door actuating mechanism. Further, after release of the stores, the totally recessed carrier mechanism is removed from consideration as a cause of drag or a source of radar signature. Thus, before and after ejection of the store, drag is reduced and specific radar images of the store handling and release mechanisms are eliminated.

An object of the present invention is to provide a store carrier and release mechanism adapted to carry one or more stores, such as bombs or missiles, in a semi-recessed condition in the fuselage or alternately in a nacell which is in turn mounted on the underside of or fuselage of an aircraft.

Another object is to provide an air bag system adapted to prevent relative movement between a store and bomb bay during ground handling and in flight. Yet another object is to provide an air bag ejection system adapted to impart a controlled ejection force to stores simultaneously with their release.

A further object is to fill a cavity left by an ejected store by means of an air bag system which improves the separation characteristics of the store deployment and reduces drag on the aircraft.

A still further object is to provide for use on an aircraft an air bag system which, after release of the store, will reduce drag on the aircraft but not form a part of the radar cross-section signature of that aircraft.

Although the characteristic features of the present invention are particularly pointed out in the appended claims, the invention and the manner in which it may be carried out will be better understood by referring to the following description taken in connection with accompanying drawings forming a part of this application.

BRIEF DESCRIPTION OF THE DRAWINGS

The objects and advantages of the present invention will become more apparent from the following detailed description in connection with the accompanying drawings, in which.

DETAILED DESCRIPTION OF THE PREFERRED EMBODIMENT

Figure 1:
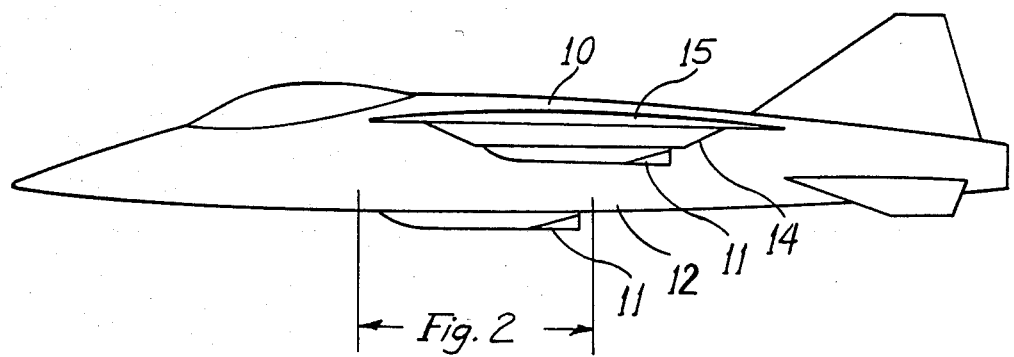
FIG. 1 is a side elevational view of an aircraft showing stores carried by an aircraft structure with each store semi-recessed in the aircraft.

In FIG. 1, an aircraft 10 is illustrated as carrying a store 11 such as a bomb or missile of substantially cylindrical configuration. When loaded aboard the aircraft, the store 11 is semi-recessed in the fuselage 12 of the aircraft 10. Alternatively, the store may be carried semi-recessed in a nacell 14, which is attached to the wing 15 of the aircraft 10.

Figure 2:
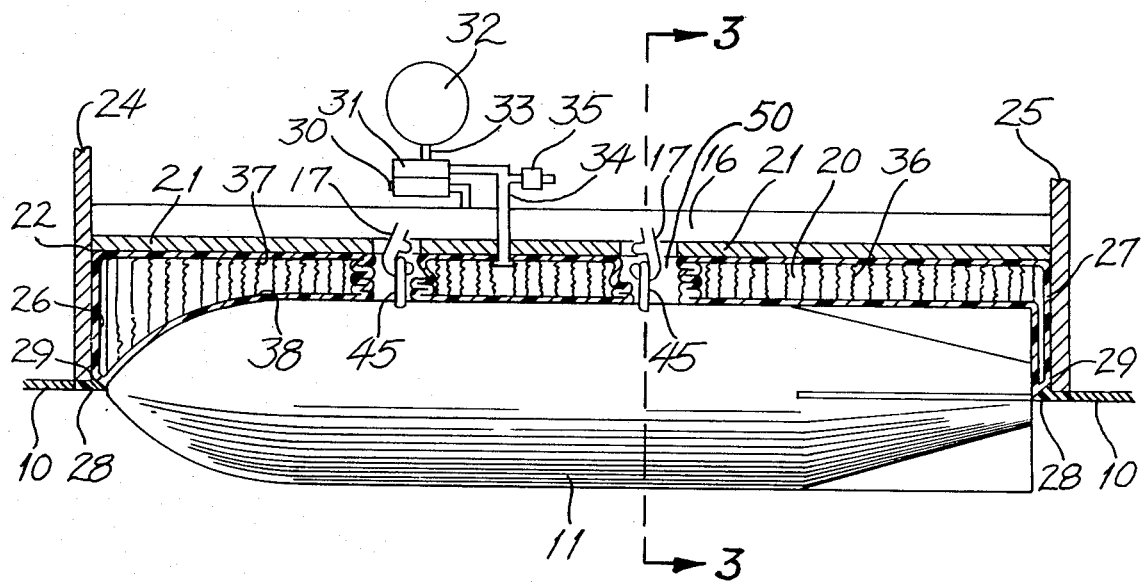
FIG. 2 is a fragmentary longitudinal view, partly in cross section, illustrating the manner of attaching a store to the aircraft.

Illustrated in FIG. 2 is a store carrier and a release mechanism for handling the store 11. The carrier and the release mechanism are arranged internally of the, chamber in which the store is carried in the aircraft. The store 11 is carried in the chamber in a latched mode in a rack 16. Mounted to the rack are release hooks 17 to which lugs 45 fixedly extending from the casing of the store are attached releasably. An air bag 20 is bonded or otherwise attached to an upper plate 21 which forms the top member of the chamber cavity 22 into which the store 11 is held semi-recessed to a depth substantially equal to half the diameter of the store 11.

The rack 16 includes a forward end plate 24 and a rearward end plate 25, which form the respective ends of the cavity 22.

To minimize turbulence and radar reflection at the store-aircraft interface, a resilient seal 28 is attached to and extends around the lower surface 29 of the cavity 22, forming a tight seal between the aircraft 10 and store 11, and forming a cover over the cavity.

In operation, the store 11 is ejected from the cavity 22 of the aircraft by actuating the bomb release hooks 17 and simultaneously inflating the air bag 20 to an ejection pressure of from 8 to 15 psi. This may be accomplished by actuating a control 30 which either operates a solenoid which releases sufficient gas, under pressure, to actuate the store release hooks 17 through a gas line (not shown) and to simultaneously open a gas valve 31 which allows ejection gas to flow from a gas supply 32, such as an accumulator through a valve input line 33 and the gas valve 31, then through an air bag line 34 and into the air bag 20 thereby forceably ejecting the store 11, and causing the air bag 20 to fill the cavity 22.

Additionally, the dual condition air bag system may include pressure control and vent devices, not shown, to control the pressure and maintain the air bag expanded to the envelope of the aircraft. Only a minimum gas pressure is required to maintain the expanded shape of the air bag since the ambient air pressure at flying altitudes is usually relatively low.

The unique structure of the air bag 20 allows the bag to totally fill the cavity 22 and conform to the envelope or exterior surface of the aircraft 10. As installed in the aircraft 10, the upper section 37 of the air bag 20 is attached to the upper plate 21 which has a desired shape that conforms to the aircraft 10. The interior of the air bag 20 is provided with a plurality of ties 36, with each tie having one end attached to an inner surface, such as upper section 37, of the air bag 20 forming a grid pattern in relation to the attaching points 40 (best seen in FIG. 4). The other end of each tie 36 is attached to an opposing inner surface, such as lower section 38 of the air bag 20, forming a mirror image of the grid pattern formed by the ties 36 on the upper section 37 of the air bag 20. The ties 36 cover the full upper and lower sections 37 and 38 respectively, in the grid like pattern, with each tie 36 being of an equal length and held to close tolerance to avoid concentrated loads from being applied to any one tie 36 thereby assuring that the lower section 38 of the air bag 20 conforms exactly to the shape of the upper section 37 of the air bag 20 and thus the envelope of the aircraft 10 when the store 11 is ejected, minimizing air turbulence and radar reflections.

Figure 3:
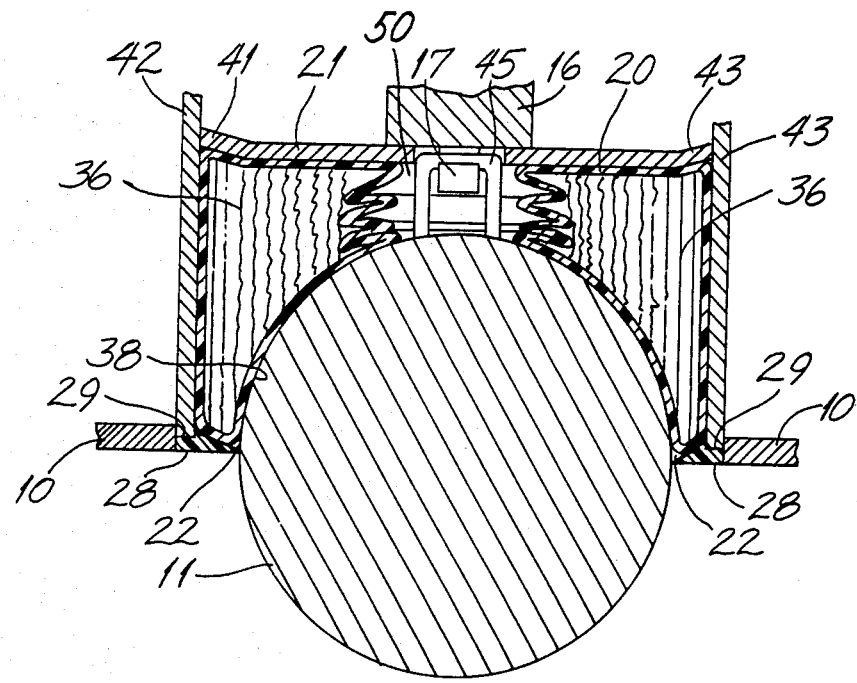
FIG. 3 is a cross sectional view, taken along section line 3—3 of FIG. 2, illustrating the use of an air bag to prevent relative movement between store and aircraft.

As will be noted by reference to FIG. 3, a first side 41 of the upper plate 21, at a location where it is attached to a first side plate 42, is bent upward to correspond to the angle of the seal 28. A second side 43 of the upper plate 21, at a location where it is attached to a second side plate 44, is also bent upward and corresponds to the angle of the seal 28. Therefore, when the store is ejected, the ties 36, being of equal length, will prevent the air bag 20 from applying any excess pressure on the seal 28. Thus, the outer or lower surface of section 38 of the air bag 20 will form a clean uninterrupted surface that conforms to a preferred shape or envelope (not shown) of the aircraft 10.

Figure 4:
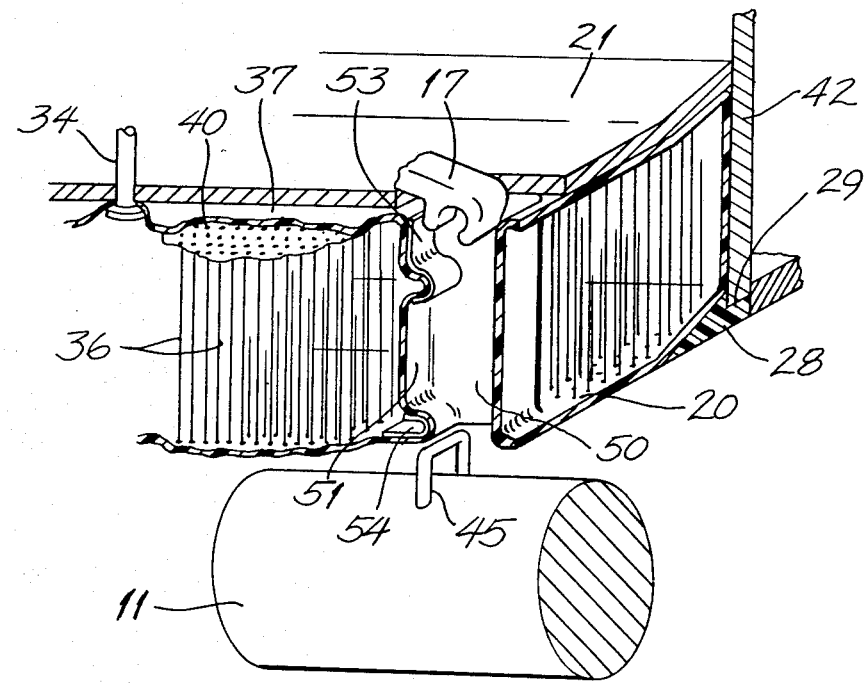
FIG. 4 is a perspective view partially in section showing details of one of the two air tight passageways extending through the air bag which are utilized during attachment and release of a store.

FIG. 4 shows how the store 11 is loaded into the cavity 22 on the store release hooks 17 which, until the store 11 is loaded thereon, are actuated to their release positions. A bleed valve 35 (best seen in FIG. 2) is opened allowing the gas to be vented from the inside of the air bag 20 whereby the air bag can be collapsed as required. The gas bleeds out of the air bag through the air bag bleed valve line 34 thereby automatically opening passageways 50 and providing a clear access path for store lugs 45 on the store to be attached to the release hooks 17. More specifically, with gas pressure removed from the inside of the air bag 20, the spring tension in the upper and lower cleats 53 and 54 respectively causes the bellows-like member 51 to automatically fold back thereby providing a clear passageway for the store lug 45 to pass through as the store 11 is urged into position. (Best seen in FIG. 2).

When the store 11 is in the proper position, the store release hooks 17 are actuated in store retention position to releasably hold the store 11 to the bomb rack 16. A low pressure source is then connected to the bleed valve 35 to pressurize the air bag 20 to its ground handling and flight pressure. Subsequently, the bleed valve may be closed and the low pressure source (not shown) may be disconnected or left under control of a pressure maintaining system (also not shown) readying the store 11 for ground handling and/or flight.

It will be noted from referring to FIG. 3 that the air bag 20 fills all the space between the store 11 and the cavity 22. When the air bag is pre-pressurized to 2-3 psi, the store 11 becomes pre-loaded at the suspension hook/store interface 17. Since the pressurized bag 20 acts against the cavity walls 22 and the store 11, most dynamically induced movements of the store relative to the aircraft due to aircraft movement during taxiing and flight are eliminated.

When ejection of the store is desired, the ejection may be accomplished as described near the beginning of this Detailed Description.

After the store 11 is ejected, each passageway 50 (best seen in FIG. 2) is automatically closed by gas ejection pressure by a bellows-like member 51 extending into each passage 50. When the pressure inside the air bag 20 exceeds the total spring tension in an upper spring cleat 53 and a lower spring cleat 54, the bellows-like member 51 is expanded into engagement with the opposing wall of the passageway to prevent entry of air into the cavity through the passageway.

The upper spring cleat 53 is bonded to the outer upper portion of each bellows-like member 51. In addition to acting to automatically open and close the bellows-like members 51, the cleat 53 provides a relatively hard surface for the store release hook 17 to work against. The lower cleat 54 is bonded inside the lower section of the bellows-like member 51 and therefore does not interfere with the smooth surface 38 of the air bag 20 when the bellows-like member 51 is expanded.

Although the invention has been described as to specific structural features, many variations may be made without departing from the spirit and scope of the invention. In some installations, use of a plurality of air bags instead of the single air bag as illustrated may be desirable. One air bag arranged toward the center of the store could be used for restraining and ejecting the store, and other air bags arranged proximate the ends of the store could be used only as cavity fillers, after the store was ejected. Alternatively, a single air bag could be used consisting of primary and secondary chambers with the primary chamber used for store ejection and the secondary chambers used to preclude relative movement between the store and cavity during ground handling and flight. Also, the passageway closing devices could be in the form of flap valves instead of expandable bellows-like sections.

I claim:

1. For an aircraft having through its envelope an open section forming a cavity adapted to carry a store suspended therein by means of store release hooks which engage lugs forming a part of the store, and from which the store can be released, an improved dual condition air-bag system arranged in said cavity, comprising:
    an inflatable air-bag having opposing interior surfaces, one of which forms an outer surface, having a plurality of ties with each tie having one end attached to one of said interior surfaces of said air-bag and the other end of each tie being attached to another interior surface of said air-bag for causing said surfaces of said air-bag to be displaced to a positive spaced relation relative to each other upon inflation of said air bag;
    said air-bag being arranged in the cavity of said aircraft to permit insertion of a store into said cavity, and to cause the outer surface to be expanded into substantial conformity with the envelope of the aircraft;
    said air-bag having at least one air-tight passage extending through said air-bag to provide clearance for lugs of the store to pass through for engagement with the release hooks; and
    said air-bag system further comprising spring cleat means in said passage to automatically open and close said passage.

* * * * *